United States Patent Office 3,390,206
Patented June 25, 1968

3,390,206
PROCESS FOR PREPARING POLYMERS HAVING ONE TERMINAL FUNCTIONAL GROUP CAPABLE OF CONDENSATION REACTION
Morice William Thompson and Frederick Andrew Waite, Maidenhead, England, assignors to Imperial Chemical Industries Limited, London, England, a corporation of Great Britain
No Drawing. Filed May 15, 1964, Ser. No. 367,883
Claims priority, application Great Britain, Aug. 6, 1963, 30,978/63
2 Claims. (Cl. 260—875)

ABSTRACT OF THE DISCLOSURE

This invention concerns a process for preparing addition polymers having essentially no unsaturated groups in the chain which are terminated by only one terminal functional group selected from the group consisting of carboxyl, hydroxyl, amine and substituted amine. The polymer having said terminal functional group is capable of undergoing condensation reaction with monomers and other polymers having functional groups capable of condensation reaction with that of the polymer. The polymers having one terminal functional group are prepared by polymerizing an ethylenically unsaturated monomer in the presence of an initiator and a chain transfer agent both of which contain the functional group e.g. $\gamma,\gamma'$-azo-bis-($\gamma$-cyanovaleric acid) as the initiator and thioglycollic acid as the chain transfer agent for terminal carboxyl groups.

---

This invention relates to new processes of producing polymers and products thereof.

It has been proposed to make addition type polymers having a terminal carboxyl group, by using in the polymerisation reaction an initiator containing a carboxyl group. The initiator to be used, according to this proposal, was chosen so that its tendency to undergo chain transfer reactions was kept at a minimum. Even so, the product of the polymerisation was a mixture of polymers. Although a proportion would contain only one terminal carboxyl group, kinetic chain termination would also produce a substantial proportion of other polymers, some containing two terminal carboxyl groups as a result of combination of growing chains and others containing an unsaturated group introduced by a disproportionation reaction.

We have found that the yield of addition polymer containing only one terminal functional group and no introduced unsaturation can be increased by polymerising an ethylenically unsaturated monomer using in combination an initiator and a chain transfer agent each of which contains the same functional group reactable in a condensation reaction.

The chain transfer agent is used in a proportion sufficient substantially to preclude kinetic chain termination which would introduce an unsaturated group by a disproportionation reaction or give rise, by combination, to polymeric chains with a reactive group at each end. A further advantage of using a chain transfer agent containing the same functional group as the initiator is that it provides an additional, and much cheaper, source of the functional groups required in the final polymer. Suitable proportions of chain transfer agent range from 5–20 gm. moles per gm. mole of initiator.

For example, to produce polymer chains containing a terminal carboxylic acid group as sole reactive group, ethylenically unsaturated monomer may be polymerised in the presence of $\gamma,\gamma'$-azobis-($\gamma$-cyanovaleric acid) as initiator and thioglycollic acid as chain transfer agent. Alternative combinations are:

$\gamma,\gamma'$-azobis($\gamma$-cyanovaleric acid)
$\alpha,\alpha'$-azobis($\alpha$-cyanoethyl-p-benzoic acid) } with { $\alpha$-mercapto propionic acid
$\beta$-mercapto propionic acid
$\alpha$-mercapto-isobutyric acid
2, 3 or 4 mercapto benzoic acid Similarly, to produce polymer chains containing a terminal hydroxyl, amine, or substituted amine reactable in a condensation reaction suitable combinations of initiator and chain transfer agent are:

$\gamma,\gamma'$-azobis($\gamma$-cyano-n-pentanol) with 2-mercapto ethanol.
$\alpha,\alpha'$-azobis($\gamma$-amino-$\alpha,\gamma$-dimethyl valeronitrile) with $\beta$-mercapto ethylamine HCl.
$\alpha,\alpha'$-azobis($\gamma$-alkylamino-$\alpha,\gamma$-dimethyl valeronitrile) with N($\beta$-mercapto ethyl)-N-alkylamine HCl.
$\alpha,\alpha'$-azobis($\gamma$-dialkylamino-$\alpha,\gamma$-dimethyl valeronitrile) with N($\beta$-mercapto ethyl)-N,N-dialkylamine HCl;
2,3 or 4 mercapto N:N-dialkylaniline HCl.

Other terminal groups, such as carboxylic acid chloride, isocyanate and epoxide, can be produced by suitable reaction from a terminal carboxylic acid or hydroxly group.

Suitable ethylenically unsaturated monomers from which the monofunctional polymer chains may be produced include:

$C_{1-18}$ esters, amides and nitriles of acrylic and methacrylic acids;
Styrene and alkyl styrenes;
$C_{1-18}$ vinyl esters;
Vinyl heterocyclic compounds, e.g. 2-vinyl pyrrolidones.

Monofunctional polymers produced in this way have several uses. For example, a very convenient method of making graft copolymers would be to copolymerise an ethylenically unsaturated monomer with a polymeric material having attached to one end of the polymeric chain an unsaturated group which will readily copolymerise with the monomer in "vinyl" manner. We have previously found that unsaturated polymeric material, which may for convenience be termed a "precursor" of a block or graft copolymer, may be made a condensation reaction which links together the polymeric chain and a compound containing the unsaturated group. Examples of such condensation reactions are those involving carboxylic acid and epoxide groups, carboxylic acid chloride and hydroxyl groups and isocyanate and amino groups. The term "condensation reaction" is used broadly to include reactions which are not necessarily elimination reactions. Where it is desired to produce graft copolymer in which only one polymeric chain has been copolymerized onto one or more precursor chains it is necesesary to use a precursor which consists, as far as possible, solely of polymeric chains each of which has only one unsaturated group at the end of the chain. Such precursors can be produced by a condensation reaction involving polymeric chains, each of which has one terminal reactive group and no form of unsaturation and for this purpose the products of this invention are particularly suitable.

The monofunctional polymers of this invention may be reacted by a condensation reaction with an ethylenically unsaturated compound containing a complementary reactive group. Suitable compounds are:

| | Compound | With polymer containing— |
|---|---|---|
| (i) | Glycidyl (meth)acrylate<br>Alkylamino alkyl (meth)acrylate<br>Vinyl ester interchange<br>Allyl alcohol | —COOH |
| (ii) | Allylamine<br>Hydroxyethyl or -propyl methacrylate | —COCl |
| (iii) | (Meth)acryl chloride<br>Vinyl isocyanate<br>Ester interchange with (meth)acrylate | —OH |
| (iv) | (Meth)acrylyl chloride<br>(Meth)acrylic acid<br>Vinyl isocyanate<br>Esters of (meth)acrylic acid | —NHR¹ |

¹(R=H or lower alkyl).

The product of such a condensation reaction is a polymeric chain which is monofunctional with respect to "vinyl" type polymerisation. Selected graft copolymers may be produced from these precursors by copolymerisation with monomer to produce a different polymeric chain.

Such selected graft copolymers are extremely useful as stabilisers in dispersion of particles in liquid for which use the copolymer needs to be one in which one polymeric component of the block or graft is solvated by the liquid phase of the dispersion and the other polymeric component is not. In most cases of such use it is the polymeric component provided by the monofunctional polymer of this invention which is the one to be solvated. For this reason, therefore, the invention is particularly valuable when used in the production of monofunctional polymer which is readily solvatable by a common organic liquid or water, particularly by non-polar organic liquids such as aliphatic and aromatic hydrocarbons. Preferred polymers are those of: lauryl methacrylate, octyl methacrylate or alkyl styrenes for use in aliphatic hydrocarbons; styrene or methyl methacrylate for use in aromatic hydrocarbons; lower methacrylate esters for use in higher alcohols; hydroxyalkyl and polyglycol acrylates and methacrylates, alkyl acrylamides and methacrylamides, acrylic and methacrylic acids and salts and vinyl pyrrolidone for use in water.

Linear block copolymers may be made by reacting a monofunctional polymer with another monofunctional polymer, both being made according to the present invention but with one of the polymers containing a functional group complementary to the functional group of the other so that the two can be reacted by a condensation reaction. Again, if the copolymer is to be used as a stabiliser of particles dispersed in a liquid, the polarity of the two polymeric components are so chosen that one is solvated by the liquid phase of the dispersion and the other is not. For example, methyl methacrylate may be polymerised using $\gamma,\gamma'$-azobis($\gamma$-cyanovaleric acid) as initiator and thioglycollic acid as chain transfer agent to produce a polymer in which substantially all the polymer chains have a carboxyl group at one end. These carboxyl groups are then converted to acid chloride groups, e.g. by treatment with thionyl chloride. Lauryl methacrylate is then polymerised using $\gamma,\gamma$-azobis($\gamma$-cyano-n-pentanol) as initiator and 2-mercapto ethanol as chain transfer agent to produce a polymer in which substantially all the polymer chains have a hydroxyl group at one end. The two polymers are then reacted in a common solvent to form an ester link between the polymethyl methacrylate and polylauryl methacrylate chains. The polylauryl methacrylate chain is non-polar and is solvated by non-polar organic liquid such as aliphatic hydrocarbons which do not solvate the relatively polar polymethyl methacrylate chain. On the other hand, a more polar organic liquid such as acetone will solvate the polymethyl methacrylate chains but not the polylauryl methacrylate chains.

Alternatively, the monofunctional polymers produced by this invention may be reacted with a polymer containing two or more complementary reactive groups so as to produce a copolymer in which two or more polymeric side chains are attached to a polymeric back-bone. Such copolymers also are useful as stabilisers of particles dispersed in a liquid and in this case it is preferably the polymeric side chains, i.e. the polymer chains of the original monofunctional polymers, which are solvated by the liquid phase of the dispersion. For example, a carboxyl-terminated polylauryl methacrylate may be reacted with a random copolymer of methyl methacrylate and glycidyl methacrylate to produce a graft copolymer. The functionality of the random copolymer may be controlled by selection of the proportions of the monomers and control of molecular weight. Other polymer-polymer condensation reactions may be carried out between say monofunctional carboxyl-terminated polyvinyl pyrrolidone and a random copolymer of glycidyl methacrylate with methyl methacrylate or lauryl methacrylate, the molar ratio of glycidyl methacrylate in the random copolymer being 10%. In a refluxing mixture of $\beta$-ethoxy ethanol and ethyl acetate, the condensation reaction will go to 50–90% completion in two hours. Alternatively, the carboxyl-terminated polyvinyl pyrrolidone may be reacted with an epoxy ester polymer; where the epoxy groups are terminal a linear block copolymer will be formed.

Where the above-described block or graft copolymers are used as dispersion stabilisers it is preferred that they contain from 1–3 solvatable polymeric chains produced by the process of this invention and preferably of molecular weight in the range 5,000 to 100,000 (number average).

In another use of the monofunctional polymers produced by this invention they are reacted by a condensation reaction with a polymer made from the same monomer but containing two or more complementary functional groups. By this means it is possible to make, in effect, a polymer with a controlled degree of branching. For example, a carboxyl-terminated polymethyl methacrylate may be reacted with a random methyl methacrylate/glycidyl methacrylate copolymer of predetermined functionality to produce a branched methyl methacrylate polymer.

The invention is illustrated by the following examples in which parts are by weight:

Example 1

To a refluxing mixture of 500 parts of ethyl acetate and 500 parts of odourless white spirit were added, concurrently, over a period of 4 hours, 1000 parts of lauryl methacrylate and a solution of 2.5 parts of $\gamma,\gamma'$-azobis($\gamma$-cyanovaleric acid) and 10 parts of thioglycollic acid in a mixture of 500 parts of ethyl acetate and 50 parts of methanol. The mixture was refluxed for a further period of 1.5 hours.

The intrinsic viscosity, in butyl acetate at 23° C., of the carboxyl-terminated polymer so prepared was 0.07 and the molecular weight was 10,000 (number average by end group assay).

An unsaturated (methacrylate) group was then attached to the polymer chains by reaction of the terminal carboxyl group as follows. The solvent from 500 parts of the polymer solution prepared above was removed by distillation until the temperature at which the residual polymer solution refluxes reaches 120–130° C. To this polymer solution were added 0.5 part lauryl dimethylamine and 6.86 parts of glycidyl methacrylate. The mixture was refluxed for 3 to 5 hours. A graft copolymer can then be formed by copolymerising an ethylenically unsaturated monomer with the unsaturated terminal group of the polylauryl methacrylate.

Example 2

The molecular weight of the monofunctional polymer may be varied by varying the proportion of chain transfer agent. For example, if in the process of Example 1, the amount of thioglycollic acid is reduced to 4.5 parts the intrinsic viscosity of the resulting polymer in butyl acetate at 23° C. is 0.110 and the number average molecular weight by end group assay is 20,000.

When the amount of thioglycollic acid is further reduced to 2.0 parts, the corresponding figures for intrinsic viscosity and molecular weight are 0.161 and 40,000 respectively.

The use of the monofunctional polymers in stabilising polymer dispersions is illustrated as follows.

The above-mentioned polymer of molecular weight 20,000 was reacted with glycidyl methacrylate as described in Example 1 to form a solution of a polymer having a terminal unsaturated (methacrylate) group. This unsaturated polymer was then used as a monofunctional precursor in the preparation of a graft copolymer stabiliser. The graft copolymer, which was used to stabilise a dispersion of a methyl methacrylate/methacrylic acid copolymer in aliphatic hydrocarbon, was prepared in situ at the same time as the disperse polymer itself. A mixture of 30 parts of the solution of unsaturated polymer prepared as above, 73 parts methyl methacrylate, 1.3 parts methacrylic acid, 1.0 part azodiisobutyronitrile, 320 parts hexane, and 95 parts of white spirit (aliphatic hydrocarbon boiling range 155–195° C.) was heated to reflux. The mixture whitened immediately. After 45 minutes under reflux, 3 parts of a 10% solution of n-octyl mercaptan in white spirit were added, followed by a mixture of 417 parts methyl methacrylate, 8.5 parts methacrylic acid, 0.7 part of n-octyl mercaptan and 0.25 part azodiisobutyronitrile, which was added at a constant rate in 2 hours. The mixture was refluxed for one hour more and than cooled. There was obtained a stable dispersion of very fine particle size in which the particles of copolymer were stabilised by a graft copolymer formed by copolymerisation of a minor portion of the monomers with the unsaturated polymer.

Alternatively, a graft copolymer may be formed in solution from the unsaturated polymer by mixing 500 parts of the solution of the terminal unsaturated polymer prepared as above with 100 parts of methyl methacrylate, 100 parts of ethyl acetate, 0.25 part of γ,γ'-azobis(cyanovaleric acid) and 0.4 part of thioglycollic acid and refluxing for 12 hours. This produces a graft copolymer of polylauryl methacrylate and polymethyl methacrylate in which the molecular weight of the two portions are in the ratio of 3:1 and on average each molecule contains one polylauryl methacrylate and one polymethyl methacrylate chain. The particular initiator and chain transfer agent were used in order that the methyl methacrylate polymer chains would be carboxyl-terminated, thus providing a means for estimating the molecular weight of those chains.

This block copolymer may be used to stabilise a polymer dispersion in organic liquid by repeating the dispersion polymerisation of Example 1 except that the 30 parts of the solution of unsaturated polymer prepared as above were replaced by 50 parts of the graft copolymer solution prepared as described above.

A similar stable polymer dispersion was obtained.

Example 3

250 parts of methyl methacrylate, 5 parts of γ,γ'-azobis (γ-cyanovaleric acid), 7.5 parts of thioglycollic acid and 500 parts dimethyl formamide are heated on a steam bath for 5 hours under nitrogen with stirring. The solids content of the resulting polymer solution is 23.3%. A further quantity of 1.5 parts of γ,γ'-azobis(γ-cyanovaleric acid) and 2.2 parts of thioglycollic acid in 3.0 parts dimethyl formamide are added and the mixture heated at approximately 90° C. for a further 3 hours.

The molecular weight of the resulting carboxyl-terminated polymer is 5000 (number average by end group assay) and the intrinsic viscosity of the polymer in ethylene dichloride at 23° C. is 0.06.

An unsaturated group may be attached to the polymer chain as in Example 1 by adding a mixture of 12 parts glycidyl methacrylate and 0.7 part of lauryl dimethylamine and heating the solution to 130° C. for 4 hours.

Example 4

300 parts of methyl methacrylate, 300 parts of ethyl acetate, 300 parts of butyl acetate, 6 parts of γ,γ'-azobis (γ-cyanovaleric acid), 12 parts thioglycollic acid and 5 parts ethanol were heated under reflux for 4 hours with stirring at 90° C. 0.8 part γ,γ'-azobis(γ-cyanovaleric acid) and 1.6 parts thioglycollic acid were added and the mixture refluxed for a further 4 hours.

The resulting carboxyl-terminated polymer had an intrinsic viscosity in ethylene dichloride at 23° C. of 0.0723 and the number average molecular weight was 3000 by end group assay.

An unsaturated group may be attached as described in Example 1, i.e. by removing solvent until the residual polymer solution refluxes in the range 120–130° C., adding 2 parts of lauryl dimethylamine and 27 parts glycidyl methacrylate and refluxing for 3 to 5 hours.

Again, the molecular weight of the monofunctional polymer can be varied by varying the proportion of initiator used. When the 6 parts of thioglycollic acid are reduced to 3 the viscosity and molecular weight rise to 0.158 and 8000 respectively, and a further reduction to 1.5 parts of thioglycollic acid brings the viscosity and molecular weight up to 0.183 and 10,000 respectively.

Example 5

Mono-carboxyl-terminated poly 2-ethylhexyl acrylate of molecular weight about 40,000 was prepared by the method described in Example 1. This was converted to a block copolymer by reacting 80 parts of it in a mixture of 260 parts β-ethoxyethyl acetate, 80 parts butyl acetate and 1 part lauryl dimethylamine with 6.25 parts of an epoxy resin of molecular weight 1000 made by reacting epichlorhydrin with 4:4'-diphenylol propane. After refluxing for 9 hours the mixture was cooled and filtered. The proportions of polymer and resin used were such that the product was a block copolymer in which substantially only one of the two epoxy groups on the resin was reacted with the carboxyl group of the polymer. Apart from the evidence of the fall in acid value of the mixture, reaction of the resin and polymer is indicated by the fact that on dilution of the reaction product with petrol only a faint opalescence is observed whereas a white floccular precipitate was obtained when the unreacted mixture was similarly diluted.

The monocarboxyl-terminated polymer described above was also reacted with a random copolymer containing epoxy groups. 150 parts of the polymer were heated, in a mixture of 525 parts butyl acetate, 500 parts aromatic hydrocarbon (boiling range 170–185° C.) and 7 parts lauryl dimethylamine with 75 parts of a random copolymer of methyl methacrylate and glycidyl methacrylate (97:3 by weight) of molecular weight about 20,000. After refluxing for 20 hours the solution was cooled. Separation into two layers occurred, the upper layer being essentially a solution of graft methacrylate/acrylate copolymer and the lower layer being essentially a solution of unreacted methacrylate copolymer.

Example 6

1700 parts of 2-ethoxyethanol and 100 parts of distilled water were heated to reflux in a flask fitted with stirrer and reflux condenser for 4 hours, during which period two feeds were added simultaneously at constant rate:

Feed 1: 1000 parts of methyl methacrylate.
Feed 2: 28 parts azobis cyanovaleric acid, 28 parts thioglycollic acid, and 20 parts sodium hydroxide, dissolved in 200 parts distilled water and 100 parts 2-ethoxyethanol.

On completion of the feeds, refluxing was continued for a further half hour. The reflux condenser was then replaced by a still head with take-off condenser and a dropping funnel.

A solution of 2 parts thioglycollic acid in 120 parts 2-ethoxyethanol was added over 1 hour while 1230 parts of distillate were collected and the vapour temperature rose to 126° C. The distillate contained 2-ethoxyethanol together with most of the water and unreacted residual monomer.

70 parts of epichlorhydrin were added to the flask and the mixture refluxed at 124° C. for 2 hours. The mixture was distilled to remove excess epichlorhydrin, until 220 parts of distillate had collected, and the distillate was replaced by addition of 220 parts of 2-ethoxyethanol.

After decanting and filtering to remove sodium chloride, the product was a clear liquid containing 32% nonvolatile material.

The extent of esterification of carboxyl groups was estimated at 95–97% by acidifying a benzene solution of the product with hydrochloric acid, extracting and washing with water until the washings were neutral, and then titrating the residual acidity.

The number average molecular weight of the epoxy-terminated polymethyl methacrylate was estimated at about 2000 by titration of the product before reaction with epichlorhydrin.

This epoxy-terminated polymethyl methacrylate can be reacted with a carboxyl-terminated polymer, such as the lauryl methacrylate polymers described in Examples 1 and 2, by refluxing a solution of the two polymers.

It can also be reacted with high functionality polymers as follows.

10 parts of the epoxy-terminated polymethyl methacrylate solution prepared as above were heated in a vessel with 200 parts 2-ethoxyethanol, 20 parts toluene, 5 parts water, 0.2 part lauryl dimethyl amine and 100 parts of a 29% solution of polymethacrylic acid in 2-ethoxyethanol containing 5% water (prepared by feeding the monomer with 0.17% azodiisobutyronitrile and 0.74% thioglycollic acid into refluxing solvents over 4 hours). Solvent was removed by distillation until the mixture refluxed at 112° C. and refluxing continued for 4 hours, then 50 parts of water were added and distillate removed until no further toluene appeared in the distillate. The product was a clear liquid giving a stable opalescent dispersion on dilution with water.

Example 7

A carboxyl-terminated polyvinyl pyrrolidone was prepared as follows.

300 parts of distilled water were heated on a steam bath in a vessel fitted with stirrer and reflux condenser to maintain a temperature of 90–95° C. A mixture of 200 parts N-vinyl pyrrolidone, 1.68 parts azobiscyanovaleric acid, 3 parts thioglycollic acid, 1.89 parts sodium hydroxide and 100 parts water, was fed into the vessel at constant rate over 5 hours and the heating continued for a further 1½ hours. (Neutralisation of acids was necessary to avoid acid catalyzed hydrolysis of monomer.

The product was a clear solution containing 34.2% nonvolatile material and less than 0.4% residual free monomer (by titration).

Sodium was removed by passage through a strong acid ion exchange resin (Zeocarb 225, previously acidified and washed with water) after dilution to about 10% concentration in water.

The number average molecular weight of the polymer was 5170 determined by titration after ion exchange (compared with 4500 calculated from azobiscyanovaleric acid and thioglycollic acid used).

The weight average molecular weight was determined from intrinsic viscosity in water before and after ion exchange, using the equations of Levy and Frank (J. Polymer Science 17, 247 (1955) and 10, 371 (1953)) and found to be 27,000 and 27,200 respectively.

The aqueous polymer solution after ion exchange was fractionated by successive additions of acetone, separating the polymer-rich phase after each addition. Number average molecular weight $M_N$ of each fraction was determined by titration of carboxyl end-groups (assuming monofunctionality) and weight average molecular weight $M_v$ from intrinsic viscosity in water. It is to be expected in fractionations of this type that the earlier fractions will be of wider molecular weight distribution, the distribution becoming narrower as the fractionation proceeds and also being narrower (other things being equal) the smaller the fraction.

The fact that the ratio of weight average to number average molecular weight approached unity as the fractionation proceeded was, therefore, strong confirmatory evidence that the polymerisation process produced monofunctional carboxyl-terminated polymer.

Example 8

Carboxyl-terminated polyvinyl pyrrolidone was made as in Example 7 but using doubled quantities of azobiscyanovaleric acid, thioglycollic acid, and sodium hydroxide. The product had a weight average molecular weight (viscometric) of 37,400 and number average molecular weight of approximately 9000.

1600 parts of a 10% aqueous solution of this polymer, after ion exchange, were concentrated to about 40% nonvolatile content by distillation of the water. Distillation was then continued with simultaneous replacement of distillate by 2-ethoxyethanol until the vapour temperature reached 130° C.

The polymer was then used to make a graft copolymer as follows. 4 parts of a propylene oxide/diphenylolpropane condensate of molecular weight approximately 380 containing 2 epoxy groups per molecule ("Epikote" 828, Shell Chemical Co.), dissolved in 16 parts 2-ethoxyethanol, and 0.4 part lauryl dimethylamine were added to the polyvinyl pyrrolidone solution and the mixture refluxed for 18 hours, during which time the acid value dropped to less than 20% of its initial value.

The product was a clear solution which on dilution with water gave a very faint opalescence showing no sign of flocculation or settlement. This graft copolymer was an effective stabiliser in aqueous dispersions of polymers.

In another preparation of a graft copolymer, 450 parts of the 10% aqueous solution of the carboxyl-terminated polyvinylpyrrolidone were transferred to 2-ethoxyethanol to yield a 40% solution by the same procedure. This solution was then refluxed for 9 hours with a solution of random methyl methacrylate/glycidyl methacrylate (99:1 by weight) copolymer in the presence of lauryl dimethylamine. The acid value fell to 17% of its original value and the product produced a stable latex on dilution with either water or acetone.

We claim:

1. A process of making addition polymer containing in its molecule essentially no unsaturated groups and only one terminal functional group reactible in a condensation reaction selected from the group consisting of carboxyl, hydroxyl, amine and substituted amine, by polymerizing ethylenically unsaturated monomer in the presence of an azo initiator and a mercapto chain transfer agent, each of which contains said functional group, the proportion of chain transfer agent being from 5–20 gm. moles per gm. mole of initiator.

2. A process for making a copolymer selected from the group consisting of block and graft copolymers by reacting in a condensation reaction a derivative group in a polymer made by the process of claim 1, said derivative group being a derivative of said functional group selected from the group consisting of carboxylic acid chloride, isocyanate, and epoxide.

References Cited

UNITED STATES PATENTS

| | | | |
|---|---|---|---|
| 2,635,099 | 4/1953 | Basdekis | 260—85.5 |
| 2,811,551 | 10/1957 | Coffman et al. | 260—537 |
| 2,870,200 | 1/1959 | Karash et al. | 260—533 |
| 3,135,716 | 6/1964 | Uraneck et al. | 260—836 |
| 2,877,212 | 3/1959 | Seligman | 260—94.7 |
| 3,222,420 | 12/1965 | Heppolette | 260—836 |
| 2,977,334 | 3/1961 | Zopf et al. | 260—27 |

OTHER REFERENCES

Pierson et al., Bis-type modifiers in Polymerization, Journal of Polymer Science, vol. XVII, pages 221–224 and 226 (1955).

Palit et al., Formation of Carboxyl End Groups in Polymers, Journal of Polymer Science, vol. 1, pages 45–51, 1961.

MURRAY TILLMAN, *Primary Examiner.*

G. F. LESMES, *Examiner.*

J. T. GOOLKASIAN, *Assistant Examiner.*